United States Patent [19]

Brändli et al.

[11] Patent Number: 4,690,422

[45] Date of Patent: Sep. 1, 1987

[54] JOINT FOR A TRANSVERSELY SEPARATED VEHICLE

[75] Inventors: Max Brändli; Hansueli Feldmann, both of Safnern, Switzerland

[73] Assignee: JD-Technologie AG, Zug, Switzerland

[21] Appl. No.: 789,627

[22] Filed: Oct. 21, 1985

[30] Foreign Application Priority Data

Oct. 26, 1984 [CH] Switzerland ........................ 05134/84

[51] Int. Cl.[4] ................................................ B60D 1/00

[52] U.S. Cl. ............................ 280/460 R; 280/461 R; 280/492

[58] Field of Search ........... 280/446 R, 460 R, 461 R, 280/489, 492, 497; 180/11, 12, 13, 14.1; 414/634, 635, 638, 481

[56] References Cited

U.S. PATENT DOCUMENTS

| | | | |
|---|---|---|---|
| 2,370,866 | 3/1945 | Lewis | 280/461 R X |
| 2,395,345 | 2/1946 | Schreck | 180/13 |
| 2,601,171 | 6/1952 | Schreck | 180/13 X |
| 2,640,611 | 6/1953 | Turner | 414/634 |
| 3,105,705 | 10/1963 | Richard | 280/461 R |
| 3,246,713 | 4/1966 | Nichols | 180/13 |
| 3,378,159 | 4/1968 | Trusock | 414/634 |
| 4,463,832 | 8/1984 | Bens, Jr. | 414/634 |

FOREIGN PATENT DOCUMENTS

| | | | |
|---|---|---|---|
| 1229113 | 9/1960 | France | 414/634 |
| 2347254 | 4/1976 | France . | |
| 365332 | 12/1962 | Switzerland . | |
| 476991 | 12/1937 | United Kingdom . | |
| 1376868 | 12/1974 | United Kingdom . | |
| 2071050 | 9/1981 | United Kingdom . | |

*Primary Examiner*—John J. Love
*Assistant Examiner*—Charles R. Watts
*Attorney, Agent, or Firm*—Werner W. Kleeman

[57] ABSTRACT

This joint allows a drive member and a driven member of a transversely divided or separated vehicle to be deflected relative to each other about a virtual pivot axis which extends in a direction transversely to the vehicle. The drive member and the driven member are connected on each side by a first support element which supports against forces acting parallel to the transverse and vertical axes of the drive member and by a second support element which supports against traction and braking forces. Each first support element contains a support roll rotatably supported in a support at the driven member and guided in the longitudinal direction of the vehicle in a slide bracket arranged at the drive member. Each second support element comprises a hinged link rotatably mounted about a respective transverse axis at the drive member and the driven member. When travelling over changing slopes or gradients there results automatic matching of axle loads and torques at the drive wheel due to the deflection of the vehicle members.

17 Claims, 13 Drawing Figures

JOINT FOR A TRANSVERSELY SEPARATED VEHICLE

BACKGROUND OF THE INVENTION

The present invention broadly relates to a new and improved construction of a transversely divided or separated vehicle and a joint for such vehicle.

In its more specific aspects the present invention relates to a new and improved construction of a vehicle which has a transversely divided wheel base and which has at least two movably joined or connected vehicle members or portions. Each vehicle member or portion possesses wheels which are rigidly guided in a vertical direction. The two vehicle members or portions are pivotable about a pivot axis against limiting stops or abutments.

Such joints can be generally used when it is intended to ensure positional and track stability of vehicles with more than three wheels during travel on uneven travel paths or surfaces.

It is known for vehicles with more than three wheels which are rigidly guided in a vertical direction, that the vertical forces are statically undetermined. For such vehicles the problem is known that on uneven travel paths or surfaces the ground adherence of at least one, for example, the steerable drive wheel can be reduced which impairs the vehicle rolling over stability and renders difficult the driving or travelling on uneven ground. Such undetermined static conditions can be prevented or eliminated by the installation of joints and generally (n—2) such joints are necessary for n axle lines.

In a shovel loader as known, for example, from German Pat. Publication No. 3,009,195, a hinge or swivel joint is arranged between the drive member or portion and the load carrying member or portion. This joint enables a swinging or swivelling motion of the two vehicle members or portions about a swivel pin which extends parallel to the longitudinal axis of the shovel loader, against two biased support elements which are arranged between the vehicle members or portions. The swivel pin therefore defines a pivot or rotary axis which extends in the longitudinal direction of the shovel loader and about which the drive member or portion and the load carrying member or portion of the shovel loader pivot or swivel relative to each other. Each of the two support elements contains an elastic ring which is clamped between limiting sleeves. The two support elements are arranged at a farthest possible distance from the swivel pin. Each support element possesses a slide or glide plate which transmits the axial pressure. The support elements limit the amplitude of the relative pivoting or swivelling motion of the drive member or portion and the load carrying member or portion.

It is a first disadvantage of this hinged or articulated connection that a swivelling or pivoting motion of the two vehicle members or portions about a pivot or rotary axis which extends transversely to the longitudinal vehicle axis, is impossible or not possible to the desired extent. When vehicles which are equipped in this manner possess more than two axles, then such vehicles are unable to equalize uneven wear of the tires in the longitudinal vehicle direction or to adapt to travel paths or surfaces which possess transverse corrugations or which are formed of horizontal ascending and descending portions. This has proven particularly disadvantageous since floor conveying vehicles often possess more than two axles and must increasingly travel over ramps of considerable descent or great ascent. In all these cases the ground adhesion of one or more wheels can be reduced despite the aforementioned swinging linkage. Especially when using steered and braked drive wheels this can have a negative effect on the drive behavior and the roll over stability of the vehicle.

A further disadvantage results from the circumstance that because of the constructional design of the swivel pin and the supporting elements the above described hinged or articulated connection of the two vehicle members or portions cannot be considered as being readily and rapidly connectable and disconnectable. This connection therefore is unsuitable for the modular assembly of vehicles when it is intended that the drive members or portions and the load carrying members or portions are intercoupled in various combinations according to the operational requirements and disconnected for servicing or repairs.

It is a further proven defect that the above mentioned hinge or swivel joint, because of its constructional design, is not displaceable in the longitudinal vehicle direction and therefore is unsuited for affecting the axle load. In a preferred embodiment of the prior art construction there are provided different arrangements of the swivel pin, however, not in the longitudinal direction of the vehicle but merely transversely thereto. It is therefore impossible to adapt the distribution of the axle loads to the operational conditions or to the course of the travel path or surface by means of longitudinally displacing the hinge or swivel joint. The present invention seeks to rectify this drawback.

SUMMARY OF THE INVENTION

Therefore, with the foregoing in mind it is a primary object of the present invention to provide a new and improved construction of a transversely divided or separated vehicle and a joint for such vehicle which does not exhibit the aforementioned drawbacks and shortcomings of the prior art constructions heretofore discussed.

A further more specific object of the present invention is directed to a new and improved construction of a transversely divided vehicle and a joint therefor and which ensures in vehicles with more than three wheels, which are rigidly guided in a vertical direction, a vertical support which is tolerant to ground unevenness to a very wide degree and which provides sufficient ground adhesion and high roll over stability, especially in the case of travel paths or surfaces with transverse corrugations or waves and otherwise uneven configurations.

Another important object of the present invention is directed to a new and improved construction of a transversely divided vehicle and a joint therefor and which is readily assembled and disassembled so that the vehicles can be disassembled into their parts for servicing or repair and their parts can be assembled to vehicles in various combinations in a mechanically modular-like manner depending upon the operational requirements.

Now in order to implement these and still further objects of the invention which will become more readily apparent as the description proceeds, the vehicle equipped with the inventive joint and the joint for such vehicle are manifested by the features that the at least two vehicle members or portions are connected on each side by means of at least one first support element supporting against forces which are parallel to the transverse and vertical axes and at least one second support element supporting against traction and braking forces. The at least two members or portions of the vehicle are deflectable from a middle or median position about at least one virtual pivot or rotary axis. The virtual pivot or rotary axis extends parallel to the transverse axes of the two vehicle members or portions and is parallelly displaceable in dependence upon a pivot angle $\alpha$ which is located between the central longitudinal axes of the two vehicle members or portions.

A first advantage of the invention results from the circumstance that the hinged or articulated connection formed by the support elements corresponds in its function to a hinge or swivel joint having a pivot or rotary axis which extends transversely to the longitudinal vehicle axis. In this case the joint is not an actual joint but constitutes a virtual hinge or swivel joint, and its construction as well as its arrangement at the vehicle can be fixed without considering constructional limitations. Because of this freedom it is possible, by correspondingly selecting the support elements, to adapt the position of the virtual hinged or swivel joint in terms of an optimum travel behavior with respect to existing operation conditions. This especially concerns the distribution of the load weight on the axles of the drive member and the driven member or portion of the vehicle as well as the placement of the application point for traction and braking forces in order to prevent undesired torques from affecting the axle load and the ground adherence of the wheels.

A further advantage can be seen in that the virtual pivot or rotary axis is automatically displaced in a parallel direction out of its middle or median position when the two members or portions of the vehicle are mutually deflected. This leads to loading or relieving of, for example, the drive wheel since, depending upon the position of the virtual pivot or rotary axis, its axle load caused by the torques of the forces during acceleration or deceleration is increased or decreased. However, this does not favorably affect the travelling behavior at all deflections and operating conditions. However, when using the inventive joint the virtual pivot or rotary axis can now be placed such that the load and relief of the drive wheel which result from the parallel displacement of the virtual pivot or rotary axis, is optimumly adapted to the course of the path to be travelled by the vehicle. This can be important in the case that a load has to be driven or braked during transition from a horizontal travel path to an ascending or descending ramp.

BRIEF DESCRIPTION OF THE DRAWINGS

The invention will be better understood and objects other than those set forth above, will become apparent when consideration is given to the following detailed description thereof. Such description makes reference to the annexed drawings wherein throughout the various figures of the drawings there have been generally used the same reference characters to denote the same or analogous components and wherein.

DETAILED DESCRIPTION OF THE PREFERRED EMBODIMENTS

Describing now the drawings, it is to be understood that to simplify the showing thereof only enough of the structure of a transversely divided vehicle and the joint therefor has been illustrated therein as is needed to enable one skilled in the art to readily understand the underlying principles and concepts of the present invention.

The invention will be described hereinbelow with reference to a driverless or unmanned floor conveying vehicle. Nevertheless, the herein illustrated and described principles are generally applicable to all similar vehicles, for example, in the material storing and handling or conveying industry.

Figure 1:
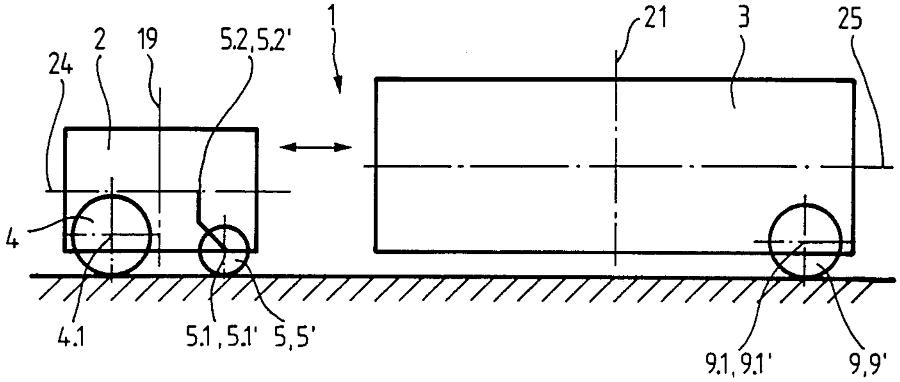
FIG. 1 is a schematic side view of a separate arrangement of the vehicle members or portions of an exemplary embodiment of a transversely divided or separated vehicle according to the invention.

Turning now specifically to FIG. 1 of the drawings, the equipment depicted by way of example and not limitation therein will be seen to comprise a transversely divided or separated floor conveying vehicle 1 with a transversely divided wheel base and containing a load carrying driven member or portion 3 which is supported on rolls or wheels 9 and 9' at one end and which can be coupled by means of the inventive joint to a drive member or portion 2 of the vehicle 1 at its other end. This driven member or portion 3 thus is carried and guided by the drive member or portion 2. It will be understood that the floor conveying vehicle 1 exemplified here can also be transversely divided twice and contain a driven member or portion 3 which is carried at both ends by related, identically constructed drive members or portions 2 arranged in a mirror image relationship.

The drive member or portion 2 of the vehicle 1 possesses at least one steered and braked drive wheel 4. Furthermore, the drive member or portion 2 is supported by at least two symmetrically arranged self-steering support wheels 5 and 5'. The wheels 4, 5, 5', 9, 9' are rigidly guided in vertical direction and define three axle lines 4.1, 5.1, 5.1', and 9.1, 9.1'. For an unambiguous determination of the vertical support of the floor conveying vehicle 1 there is thus required (3−2), that is one inventive joint.

Figure 2:
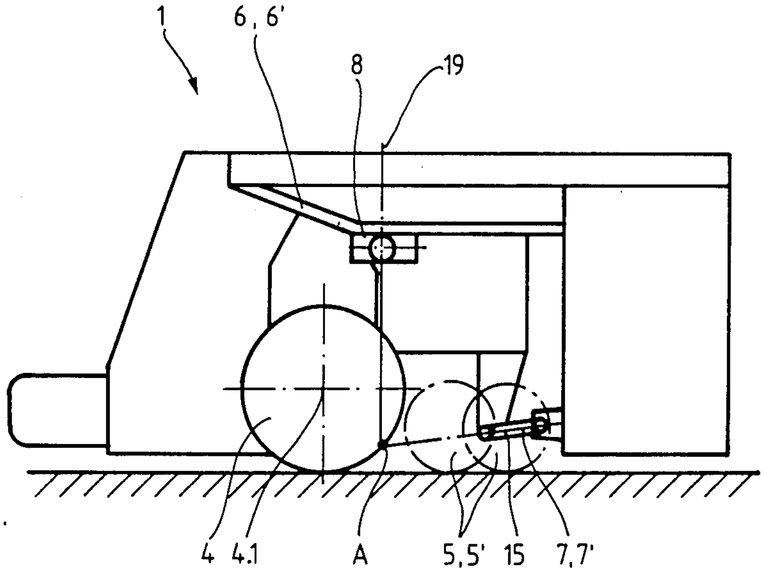
FIG. 2 is a schematic elevational view of the vehicle shown in FIG. 1 and containing a drive member or portion, a driven member or portion and a joint therebetween.
Figure 3:
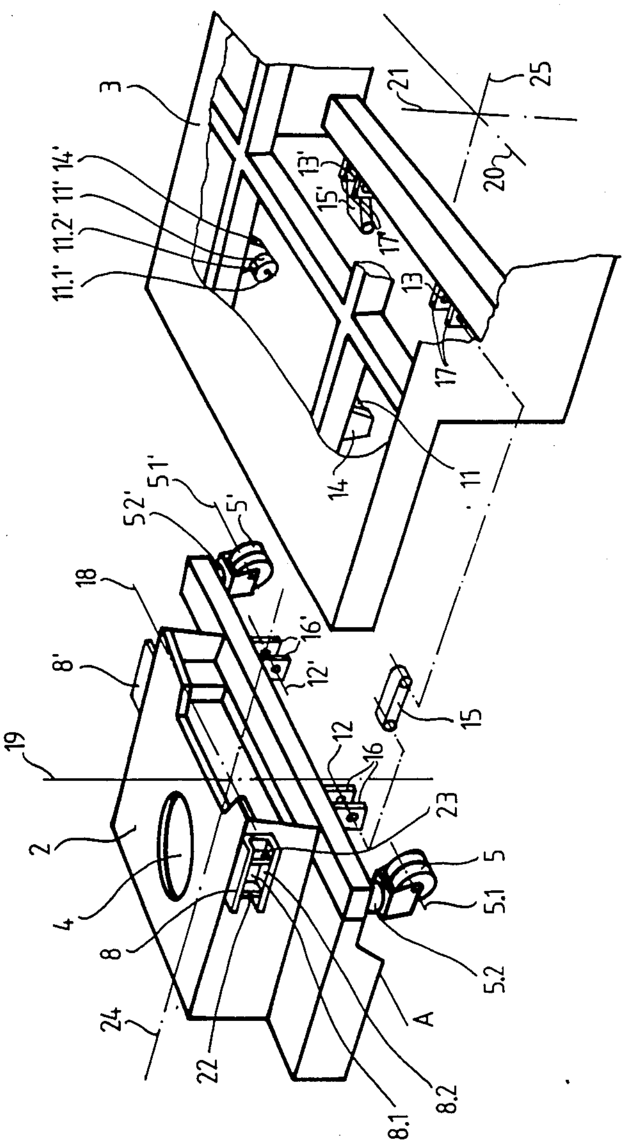
FIG. 3 is a perspective view of a part of the vehicle shown in FIG. 2.

FIGS. 2 and 3 illustrate the principal construction of the drive member or portion 2 of the vehicle 1. There is respectively shown schematically in elevation and in section the manner in which the drive member or portion 2 and the driven member or portion 3 of the vehicle 1 are movably interconnected by means of the inventive joint. The inventive joint or hinged or articulated connection contains two types of support elements which are symmetrically arranged relative to a vertical longitudinal middle or central plane on both sides of the vehicle 1, that is to say, on both sides of the drive member or portion 2 and the driven member or portion 3. The two types of support elements comprise first support elements 6 and 6' supporting against forces which are directed in a transverse and vertical direction of the drive member or portion 2 of the vehicle 1, and second support elements 7 and 7' supporting against traction and braking forces.

The first support elements 6 and 6' contain as their core or main elements related support rolls 11 and 11' which are rotatably supported at the driven member or portion of the vehicle 1 by means of related supports 14 and 14'. The support rolls 11 and 11' are displaceably guided at the drive member or portion 2 of the vehicle 1 in related slide brackets or channels 8 and 8' parallel to a central longitudinal axis 24 of this drive member or portion 2. Related stops or abutments of the slide brackets 8 and 8' are respectively designated by the reference characters 22 and 23 as well as 22' and 23'. The stops or abutments 22, 23, 22', 23' can be pre-biased and serve to limit the relative deflections of the drive member or portion 2 and the driven member or portion 3 of the vehicle 1.

The second support elements 7 and 7' each contain as their core or main elements related hinged or swivel links or supports 15 and 15' which are mounted with their related ends at the drive member or portion 2 and at the driven member or portion 3 of the vehicle 1 in related shackles or lugs 16 and 17 as well as 16' and 17'. The hinged or swivel links or supports 15 and 15' are pivotably or rotatably mounted about related predetermined or transverse axes 12 and 13 as well as 12' and 13'.

A transverse plane 29 passes through the support rolls 11 and 11' and extends parallel to a vertical axis 19 of the drive member or portion 2. A predetermined plane 30 defined by the two parallel hinged or swivel links or supports 15 and 15' intersects the transverse plane 29 along an intersection line 28 which respectively extends parallel to related transverse axes 18 and 20 of the drive member or portion 2 and the driven member or portion 3 of the vehicle 1. This intersection line 28 serves as a virtual joint defined by a virtual pivot or hinge axis A and the virtual joint has the same effect as the hinged or swivel joint formed by the first support elements 6 and 6' and the second support elements 7 and 7'. The arrangement of the first and second support elements 6, 6' and 7, 7' as well as the course of the parallel hinged or swivel links or supports 15 and 15' are selected such that the virtual pivot or hinge axis A which results therefrom, optimally corresponds to the operational requirements. This will be extensively explained hereinbelow with reference to FIGS. 4 and 5. The steerable drive wheel 4, the trailing support wheels 5 and 5' as well as the rolls or wheels 9 and 9' are arranged and constructed in a manner which is known as such.

Figure 4:
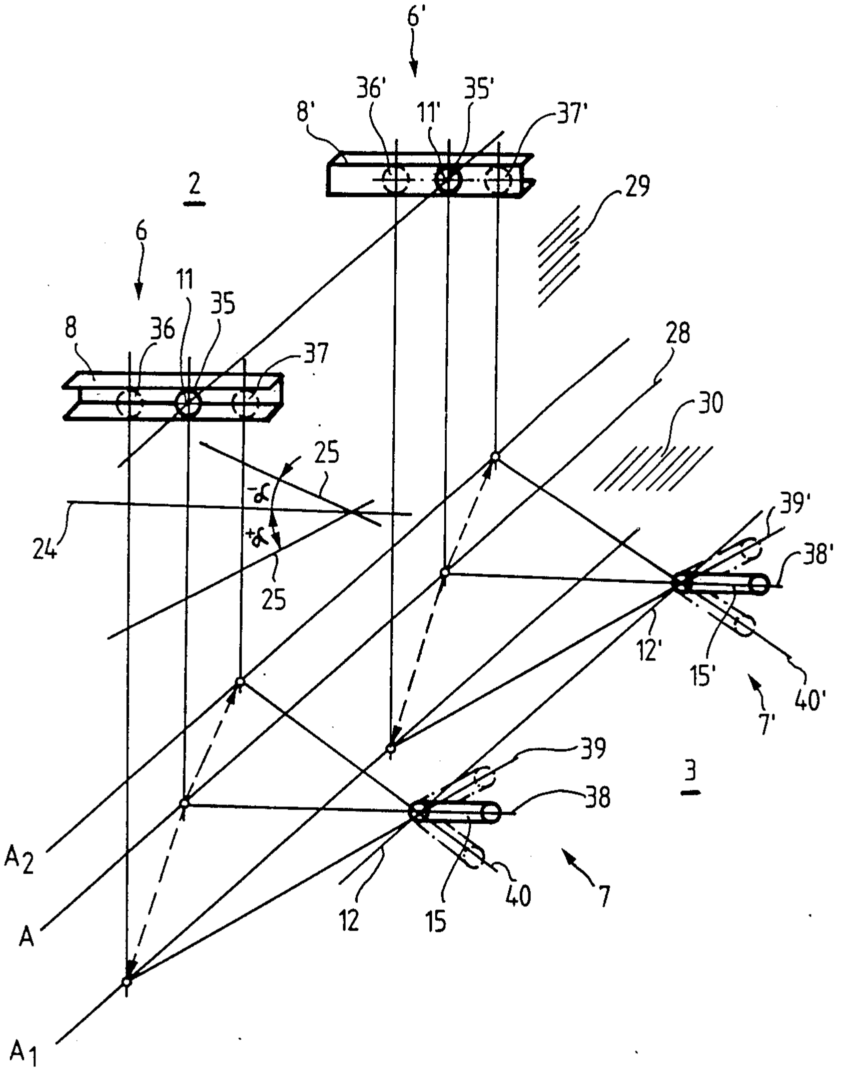
FIG. 4 is a diagram explaining the function of the inventive joint in the vehicle shown in FIGS. 1 to 3.

FIG. 4 shows the fundamental relationship between the inventive joint formed by the first and second support elements 6, 6' and 7, 7' and the virtual joint which has the same effect. The virtual pivot or hinge axis A of the virtual joint results as the intersection line 28 between the transverse plane 29 which extends parallel to the vertical axis 19 of the drive member or portion 2 of the vehicle 1 and through the support rolls 11, 11', and the horizontal plane 30 which extends through the two parallel hinged or swivel links or supports 15 and 15'. A deflection angle $\alpha$ is formed between the central longitudinal axis 24 of the drive member or portion 2 and a central longitudinal axis 25 of the driven member or portion 3 of the vehicle 1. This angle $\alpha$ serves for the quantitative determination of the relative deflection of the drive member or portion 2 and the driven member or portion 3 of the vehicle 1 about the transversely extending virtual pivot or hinge axis A. This is made possible by the first and second support elements 6, 6' and 7, 7'. The deflection angle $\alpha$ is measured from the central longitudinal axis 24 of the drive member or portion 2 of the vehicle 1, namely with a positive sign in an anti-clockwise direction and with a negative sign in a clockwise direction. In a given construction of the inventive joint each deflection angle $\alpha$ corresponds to a predetermined position of the support rolls 11 and 11' in the related slide brackets 8 and 8', to a predetermined inclination of the parallel hinged or swivel links or supports 15 and 15' as well as to a predetermined virtual pivot or hinge axis A.

Therefore, the following associations are apparent from FIG. 4:

For $\alpha=0$, the positions 35 and 35' of the support rolls 11 and 11', the horizontal positions 38, 38' of the hinged or swivel links or supports 15 and 15' and the virtual pivot or hinge axis A;

for positive deflections $+\alpha$, the positions 36 and 36', the inclinations 39 and 39', and the virtual pivot or hinge axis $A_1$;

for negative deflections $-\alpha$, the positions 37 and 37', the inclinations 40 and 40', and the virtual pivot or hinge axis $A_2$.

FIGS. 5*a* to 5*d* show two vehicle members or portions 2 and 3, connected in accordance with the invention, on uneven travel paths or surfaces. Four particularly frequently occurring uneven travel paths or surfaces are depicted: namely, a surface with transverse corrugations or waves 41, a concavely curved travel path or surface 42, a convexly curved travel path or surface 43, as well as a travel path or surface which is twisted about its longitudinal direction 44. In all the illustrated cases of unevenness the road adherence of all vehicle wheels 4, 5, 5', 9, 9' is ensured.

The inventive joint makes possible travel paths or surfaces which hitherto could not or only with restrictions be travelled upon by vehicles with more than three wheels which are rigidly guided in a vertical direction. Four particularly typical courses of travel paths or surfaces are shown in FIGS. 6*b* to 6*e* in comparison with a horizontal travel path or surface 33 shown in FIG. 6*a*. FIGS. 6*b* to 6*e* show the transition between horizontal travel paths or surfaces 27 and ascending or descending ramps 31 or 32. Corresponding to the deflection angle $\alpha$ there result different positions of the related or momentary virtual pivot or hinge axes A, $A_1$, $A_2$, . . . in respect of the drive member or portion 2 of the vehicle 1. When the vehicle 1 is travelling on the horizontal path or surface 33 according to FIG. 6*a*, the inventive joint is located in the middle or median position at a deflection angle $\alpha=0$ associated with the corresponding virtual pivot or hinge axis A. For positive and negative deflection angles $+\alpha$ and $-\alpha$ according to the FIGS. 6*b*, 6*e* and 6*c*, 6*d*, the related parallelly displaced momentary virtual pivot or hinge axes are designated by $A_1$, $A_4$ and $A_2$, $A_3$. The load variations which result from the parallel displacement of the virtual pivot axis $A_1$, especially the load variations at the drive wheel 4, as well as the effects such load variations have on the driving conditions of a transversely divided or separated vehicle 1 will be further explained hereinbelow in the description of the operation with reference to FIGS. 6*a* to 6*e*.

With reference to FIGS. 1 to 6e there will be briefly explained in the following the function of the joint according to the invention. In this explanation there will be especially considered also the conditions when travelling through slope or gradient transitions.

Steering of the drive wheel 4 in the drive member or portion 2 of the vehicle 1 can be manually effected in known manner, by means of a tow bar or, as in FIG. 1, in the illustrated embodiment shown, automatically by scanning or following a guide line which is embedded in the floor or reproduced in a vehicle carried memory or storage. The trailing support wheels 5 and 5' are self-steering due to the fact that they possess steering axles 5.2 and 5.2' which are spaced from their running axles 5.1 and 5.1'. It is self-evident that the floor conveying vehicle 1 can be driven forwardly as well as rearwardly. In the main forward travel direction the drive member or portion 2 constitutes the leading member and pulls the driven member or portion 3 of the vehicle 1. The inventive joint therefore is likewise used for the transmission of traction and braking forces.

FIGS. 2, 3 and 4 show in detail in which manner the first support elements 6 and 6' and the second support elements 7 and 7' cooperate in the function of the inventive joint and in which manner this function is exclusively determined by the mutual deflection of the drive member or portion 2 and the driven member or portion 3 of the vehicle 1 independent of their position relative to the horizontal. For the sake of simplicity the two vehicle members 2 and 3 are shown in FIGS. 2 and 3 on a horizontal travel path or surface, whereas in FIG. 4 the driven member or portion 3 is additionally deflected in relation to the horizontal drive member or portion 2 by the angles $+\alpha$ and $-\alpha$.

In accordance with FIGS. 2 and 3 the support rolls 11 and 11' are guided in the related slide brackets or channels 8 and 8' which extend parallel to the central longitudinal axis 24 of the drive member or portion 2 of the vehicle 1. The support rolls 11 and 11' are, in fact, guided on running surfaces 8.2 and 8.2' of the related slide brackets 8 and 8' and along the related end faces 8.1 and 8.1'. Consequently, when $\alpha=0$, the support rolls 11 and 11' assume a middle or median position between the stops or abutments 22, 23 and 22', 23'. The middle or median position corresponds to the length of the related hinged or swivel links or supports 15 and 15'. In this arrangement forces are transferred in two mutually perpendicular directions between the drive member or portion 2 and the driven member or portion 3 of the vehicle 1. These forces are transferred in the vertical direction of the drive member or portion 2 of the vehicle 1, i.e. at right angles to the running surfaces 8.2 and 8.2' of the related slide brackets 8 and 8' through their cooperation with the related running surfaces 11.2 and 11.2' of the related support rolls 11 and 11'. These forces are also transferred in the transverse direction of the drive member or portion 2 of the vehicle 1, i.e. at right angles to the end faces 8.1 and 8.1' of the related slide brackets 8 and 8' through their cooperation with the related support roll end faces 11.1 and 11.1' which are remote from the related supports 14.

The parallel hinged or swivel links or supports 15 and 15' by means of which the traction and braking forces are transmitted between the vehicle members or portions 2 and 3 of the vehicle 1 are arranged such that, at $\alpha=0$, they extend at an inclination of approximately 15° relative to the central longitudinal axes 24 and 25. In this manner there is ensured that the relatively movable vehicle members or portions 2 and 3 are kept spaced from each other with little wear.

For an explanation of the actual function of the joint, i.e. the interaction of the first and second support elements 6, 6' and 7, 7' at varying deflection angles $\alpha$, additional reference is made to FIG. 4. It will be assumed that the driven member or portion 3 of the vehicle 1 is deflected by an angle $\alpha$ in the positive direction and in the negative direction relative to the drive member or portion 2 of the vehicle 1. During the positive deflection by a deflection angle $+\alpha$ the hinged or swivel links or supports 15 and 15' swivel or pivot about the related transverse axes 12 and 12' from the related horizontal positions 38 and 38' into the related inclinations 39 and 39'. Simultaneously, the support rolls 11 and 11' are displaced in the related slide brackets 8 and 8' out of their related middle or median positions 35 and 35' into the related positions 36 and 36'. During this operation the virtual pivot or hinge axis A is displaced parallel to itself and is converted into the new virtual pivot or hinge axis $A_1$.

An analogous process proceeds for negative deflection angles $-\alpha$. In this case the hinged or swivel links or supports 15 and 15' swivel or pivot into the related inclinations 40 and 40'. The support rolls 11 and 11' are displaced into the related positions 37 and 37'. The virtual pivot or hinge axis A is converted into the virtual pivot or hinge axis $A_2$.

Whereas the position of the virtual pivot or hinge axis A in its relation to the drive member or portion 2 of the vehicle 1 depends upon the deflection angle $\alpha$, its parallel displacement exclusively is a function of the direction of deflection and is independent of the deflection angle $\alpha$ from which the deflection starts. Accordingly, the virtual pivot or hinge axis A is downwardly displaced on deflection in the positive direction and in the forward travel direction and upwardly displaced on deflection in the negative direction and in the rearward travel direction.

Figure 5A:
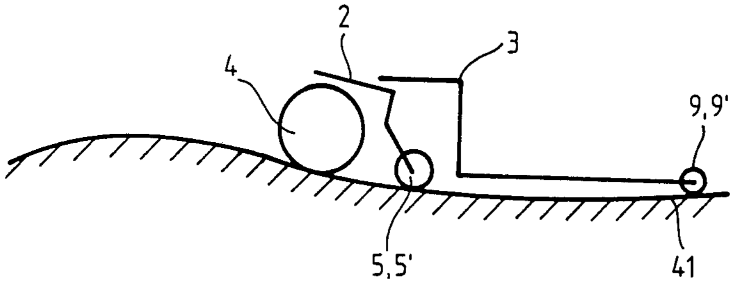
FIGS. 5*a* to 5*d* are schematic illustrations of the vehicle shown in FIG. 1 during its travel over frequently occurring uneven travel paths or surfaces.
Figure 5B:
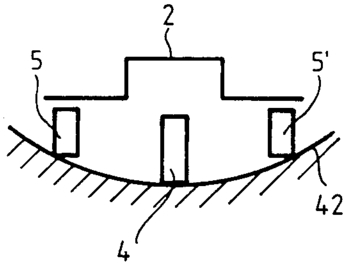
Figure 5C:
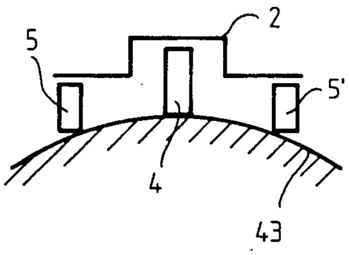
Figure 5D:
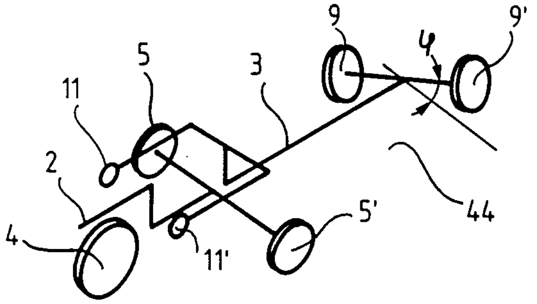

In the travel path or surface runs depicted in FIGS. 5a, 5b and 5c the inventive joint functions as an equalization or balancing means for unevenness, so that a statically unambiguously determined vertical support is achieved in the presence of the five vehicle wheels 4, 5, 5', 9, 9' which are provided. Travel path or surface twists in accordance with FIG. 5d are equalized or balanced due to the torsional elasticity of the vehicle 1. Obliquely corrugated travel paths or surfaces which are not further illustrated in this context, can be mastered through the cooperation of the inventive joint and the torsional elasticity of the vehicle 1.

Figure 6A:
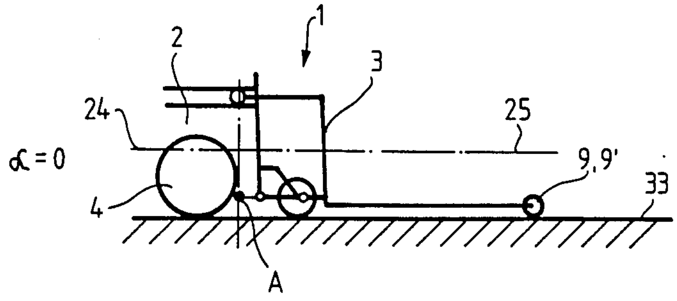
FIG. 6*a* is a schematic illustration of the vehicle shown in FIG. 1 and the conditions during its travel on an even and horizontal travel path or surface.
Figure 6B:
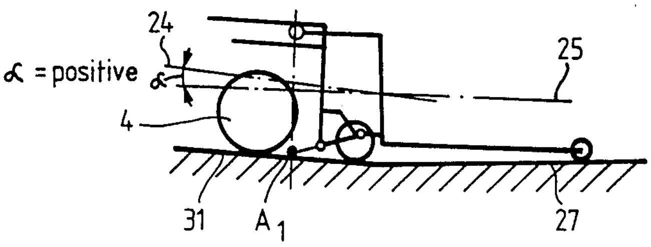
FIGS. 6*b* to 6*e* are respective schematic illustrations of the vehicle shown in FIG. 1 and the conditions of its travel during transitions between horizontal travel paths or surfaces and ascending or descending ramps.
Figure 6C:
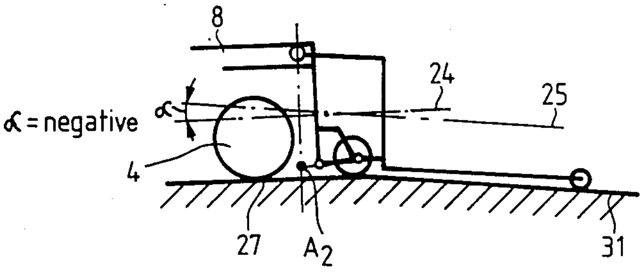
Figure 6D:
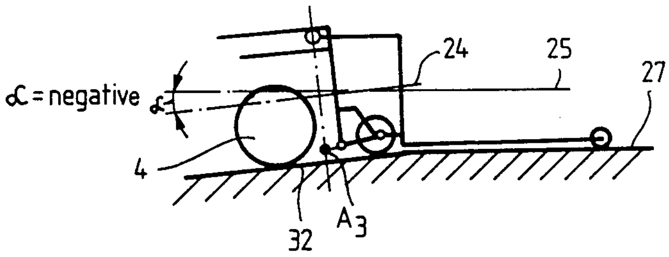
Figure 6E:
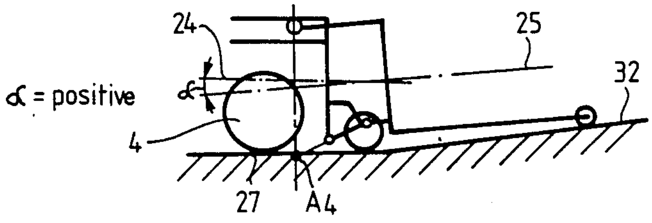

FIGS. 6a to 6e show the function of the inventive joint on different travel paths or surfaces, namely during travel on the planar horizontal travel path or surface 33 as shown in FIG. 6a, during travel over positive slope or gradient transitions as shown in FIGS. 6b and 6e as well as during travel over negative slope or gradient transitions as shown in FIGS. 6c and 6d. When entering the ascending ramp 31 in accordance with FIG. 6b, the drive wheel 4 produces an enhanced or increased drive torque which requires an increase of its axle load. This increase of the axle load is effected by the torque caused by the traction force which acts upon the drive member or portion 2 of the vehicle 1 since the point of application or attack of the traction force, during positive deflection, is downwardly displaced conjointly with the virtual pivot or hinge axis A in the forward travel direction. During the following exit travel onto the horizontal travel path or surface 27 shown in FIG. 6c, the drive torque acting upon the drive wheel 4 is reduced so as not to exceed the maximum allowable drive speed. Correspondingly, the axle load on the drive wheel 4 is reduced in this region because the virtual pivot or hinge axis A and thus the attack point of the traction force are upwardly displaced in the rearward travel direction as a result of the negative deflection.

If the maximum allowable drive speed is not to be exceeded, a further reduction of the drive torque is necessary during the transition from the horizontal travel path or surface 27 to the descending ramp 32 in accordance with FIG. 6d. The thus enabled reduction in the axle load is again automatically effected due to the fact that the virtual pivot or hinge axis A and conjointly therewith the application or attack point of the traction force are rearwardly and upwardly displaced due to the negative deflection of the two vehicle members or portions 2 and 3.

Finally, during the exit travel from the descending ramp 32 as depicted in FIG. 6e, the braking torque must be reduced in order to gradually change over to a drive torque. This allows a corresponding reduction in the axle load at the drive wheel 4. Therefore, the virtual pivot or hinge axis A and conjointly therewith the attack point of the braking force are forwardly and downwardly displaced due to the deflection of the two vehicle members or portions 2 and 3.

In summary, the result is achieved that the virtual pivot or hinge axis A is displaced from its middle or median position due to the positive and negative deflections by the deflection angles $+\alpha$ and $-\alpha$ such that the torques which act upon the drive member or portion 2 of the vehicle 1 as the result of the traction and braking forces, automatically adapt the axle load of the drive wheel 4 to the driving and braking moments to be provided by the drive wheel 4.

While there are shown and described present preferred embodiments of the invention, it is to be distinctly understood that the invention is not limited thereto, but may be otherwise variously embodied and practiced within the scope of the following claims.

Accordingly, what we claim is:

1. A vehicle comprising:

a wheel base divided along at least one transverse line;

two vehicle members arranged on opposite sides of said at least one transverse line dividing said wheel base;

each one of said two vehicle members having a transverse axis and a vertical axis;

at least one joint means for pivotably interconnecting said two vehicle members across said at least one transverse line dividing said wheel base and for permitting relative deflections of said two vehicle members through a deflection angle during travel of the vehicle on uneven ground;

means for pivotably movably mounting said two vehicle members relative to each other about a predetermined transverse pivot axis;

said pivotably movably mounting means including a predetermined number of abutment means for limiting said pivotable movement of said two vehicle members about said predetermined transverse pivot axis such that the angle formed by the vertical axes of said two vehicle members is variable and proprotional to the deflection angle between said two vehicle members;

each one of said two vehicle members containing a predetermined number of wheels and two sides;

said two vehicle members comprising means for rigidly guiding said predetermined number of wheels at each one of said two vehicle members in a substantially vertical direction;

said two vehicle members being connected on each one of said two sides thereof by at least one first support element comprising means for supporting said two vehicle members against forces which are directed substantially parallel to said transverse axes and against further forces which are directed substantially parallel to said vertical axes of said two vehicle members;

said two vehicle members being connected on each one of said two sides thereof by at least one second support element comprising means for supporting said two vehicle members against traction and braking forces acting upon said two vehicle members;

said at least one first support element and said at least one second support element on said two sides of said two vehicle members cooperating with each other and conjointly constituting said at least one joint means;

said cooperating at least one first and at least one second support element having a plurality of predetermined interdependent positions relative to one another each of said interdependent positions having a predetermined deflection angle between said two vehicle members and a predetermined transverse virtual pivot axis which comprises said predetermined transverse pivot axis;

each one of said two vehicle members possessing a central longitudinal axis;

each one of said predetermined transverse virtual pivot axes extending substantially parallel to said transverse axes of said two vehicle members; and said at least one joint means including means for permitting deflections of said two vehicle members relative to each other from a median position in which said predetermined transverse virtual pivot axis lies on a first axis to a deflected position in which said predetermiend transverse virtual pivot axis lies on a second axis substantially parallelly displaced from said first axis.

2. The vehicle as possesses in claim 1, wherein:

said vehicle defines a longitudinal median plane; and said at least one first and said at least one second support elements are arranged in pairs on said two sides of said two vehicle members in a mirror image relationship relative to said longitudinal median plane defined by said vehicle.

3. The vehicle as defined in claim 1, further including:

a predetermined number of supports disposed on each one of said two sides of one of said two vehicle members;

said at least one first support element disposed on each one of said two sides of said vehicle members containing a support roll;

said support roll of said at least one first support element being rotatably journalled at one of said predetermined number of supports;

a predetermined number of substantially U-shaped slide brackets extending substantially parallel to said central longitudinal axis of the other one of said two vehicle members;

said support roll rotatably journalled at said one vehicle member by means of said one of said predetermined number of supports being guided in one of said predetermined number of slide brackets on said other vehicle member;

each one of said predetermined number of slide brackets on said other vehicle member including an end face;

said support roll of said at least one first support element on each one of said two sides of said one vehicle member containing a surface which is remote from a respective one of said predetermined number of supports; and said surface of said support roll which is remote from said one support, comprising a transverse-pressure transmitting slide surface and engaging said end face of said slide bracket guiding said support roll.

4. The vehicle as defined in claim 3, wherein:

said at least one second support element provided on each one of said two sides of said vehicle members, contains a hinged link having a predetermined axis extending substantially parallel to said transverse axes of said two vehicle members; and said at least one second support element being pivotable about said predetermined axis.

5. The vehicle as defined in claim 1, wherein:

one of said two vehicle members constitutes a drive member of said vehicle and contains at least one steerable and brakeable drive wheel;

an other one of said two vehicle members constituting a driven member of said vehicle and containing passive wheels; and said drive member and said driven member being pivotably interconnected by the joint means containing said at least one first support element and said at least one second support element on each one of said two sides of said drive member and said driven member.

6. The vehicle as defined in claim 3, wherein:

said predetermined number of abutment means limiting said pivotable movement of said predetermined transverse two vehicle members about said at least one virtual pivot axis, constitute stops arranged in said predetermined number of substantially U-shaped slide brackets on said other vehicle member.

7. The vehicle as defined in claim 6, wherein:

said at least one second support element on each one of said two sides of said two vehicle members, contains a hinged link having a predetermined axis extending substantially parallel to said transverse axes of said two vehicle members;

said at least one second support element being pivotable about said predetermined axis; and said stops and said hinged links are removably attached to said vehicle members in order to facilitate the assembly and disassembly of said two vehicle members.

8. The vehicle as defined in claim 4, wherein:

one of said two vehicle members possesses a transverse plane extending substantially parallel to said vertical axis of said one vehicle member and through said support rolls received in said slide brackets of said one vehicle member and rotatably journalled at an other one of said two vehicle members;

said hinged links of said at least one second support element on each one of said two sides of said two vehicle members, extending substantially parallel to each other and defining a predetermined plane extending through said parallel hinged links; and said predetermined transverse virtual pivot axis constituting an intersection line formed by said transverse plane extending through said support rolls and said predetermined plane extending through said parallel hinged links.

9. The vehicle as defined in claim 1, wherein:

each said predetermined transverse virtual pivot axis constitutes a momentary virtual pivot axis for a momentary deflection angle between said two vehicle members.

10. The vehicle as defined in claim 1, wherein:

one of said two vehicle members constitutes a drive member containing a drive wheel;

said drive wheel of said drive member is loaded by a load which is proportional to said traction and braking forces.

11. A joint pivotably interconnecting two vehicle members each having a vertical axis across a transverse line dividing the wheel base of a vehicle in order to permit relative angular deflections of the vertical axes of said two vehicle members due to vehicle travel on uneven ground, each one of said two vehicle members having a transverse axis and a central longitudinal axis, said joint comprising:

first support elements provided on two sides of said two vehicle members;

said first support elements comprising means for supporting said two vehicle members against forces which are directed substantially parallel to said transverse axes and to said vertical axes of said two vehicle members;

second support elements provided on said two sides of said two vehicle members;

said second support elements comprising means for supporting said two vehicle members against traction and bracking forces acting upon said two vehicle members;

said first and second support elements cooperating with each other and having predetermined interdependent positions each of which positions has a predetermined deflection angle between said two vehicle members and a predetermined transverse virtual pivot axis; and said first and second support elements including means for permitting relative angular deflections of the vertical axes of said two vehicle members and corresponding parallel displacements of said predetermined transverse virtual pivot axis.

12. The joint as defined in claim 11, wherein:

said first support elements and said second support elements are arranged on two sides of the vehicle in pairs;

said vehicle defining a central longitudinal plane; and said pairs of first support elements and said pairs of second support elements are arranged in a mirror-image relationship with respect to said central longitudinal plane.

13. The joint as defined in claim 11, wherein:

each one of said first support elements contains a support roll;

each said support roll being rotatably journalled at a support on one of said two vehicle members;

each said support roll being guided in a substantially U-shapd slide bracket on the other one of said two vehicle members and extending substantially parallel to the central longitudinal axis of the other vehicle member;

each said support roll contains an end face which is remote from the support;

each said slide bracket contains an end face; and said end face of each support roll which is remote from said support constituting a transverse-pressure transmitting slide surface and engaging said end face of the slide bracket.

14. The joint as defined in claim 11, wherein:

each said second support element contains a hinged link;

each of said hinged link defines an axis; and said axes of said hinged links extending substantially parallel to said transverse axes of the two vehicle members; and said hinged links being pivotable about said axis thereof and pivotably mounted at said two vehicle members.

15. The joint as defined in claim 13, wherein:

each one of said U-shaped slide brackets contains at least two abutments; and said abutments of said U-shaped slide brackets limiting the relative deflection of said two vehicle members about said predetermined transverse virtual pivot axis.

16. The joint as defined in claim 15, wherein:

each said second support element contains a hinged link;

each said hinged link defines an axis;

said axes of said hinged links extending substantially parallel to said transverse axes of the two vehicle members;

said hinged links being pivotable about said axes thereof and being pivotably mounted at said two vehicle members; and said hinged links and said abutments being readily removably attached to said two vehicle members in order to facilitate the assembly and disassembly of the two vehicle members.

17. The joint as defined in claim 16, wherein:

one of said two vehicle members defines a transverse plane which extends substantially parallel to the vertical axes and to the support rolls mounted in said slide brackets of said one vehicle member;

said parallel hinged links define a predetermined plate; and said predetermined transverse virtual pivot axis about which said two vehicle members are deflectable relative to each other, constituting an intersection line between said transverse plane defined by said one vehicle member and said predetermined plate defined by said parallel hinged links.

* * * * *

UNITED STATES PATENT AND TRADEMARK OFFICE
CERTIFICATE OF CORRECTION

PATENT NO. : 4,690,422

DATED : September 1, 1987

INVENTOR(S) : Max Brändli et al.

It is certified that error appears in the above-identified patent and that said Letters Patent is hereby corrected as shown below:

Column 5, line 11, after "portion" please insert --3--

Column 10, line 1, please delete "proprotional" and insert --proportional--

Claim 2, line 1, please delete "possesses" and insert --defined--

Claim 2, line 2, please delete "defines" and insert --possesses--

Claim 6, line 3, please delete "predetermined"

Claim 6, line 4, please delete "transverse"

Claim 6, line 4, please delete "at least"

Claim 6, line 4, please insert --predetermined transverse--

Claim 6, line 5, please delete "one"

Claim 14, line 4, please delete "and"

Claim 17, line 7, please delete "plate" and insert --plane--

UNITED STATES PATENT AND TRADEMARK OFFICE

CERTIFICATE OF CORRECTION

PATENT NO. : 4,690,422

DATED : September 1, 1987

INVENTOR(S) : Max Brändli et al.

It is certified that error appears in the above-identified patent and that said Letters Patent is hereby corrected as shown below:

Claim 17, line 12, please delete "plate" and insert -- plane --.

Signed and Sealed this

Twenty-ninth Day of March, 1988

*Attest:*

DONALD J. QUIGG

*Attesting Officer*

*Commissioner of Patents and Trademarks*